Aug. 31, 1965    J. D. MALLORY    3,203,529
ARTICLE HANDLING APPARATUS
Filed Dec. 3, 1962    6 Sheets-Sheet 4

INVENTOR.
JAMES D. MALLORY
BY W. A. Schaich &
D. T. Innis
ATTORNEYS

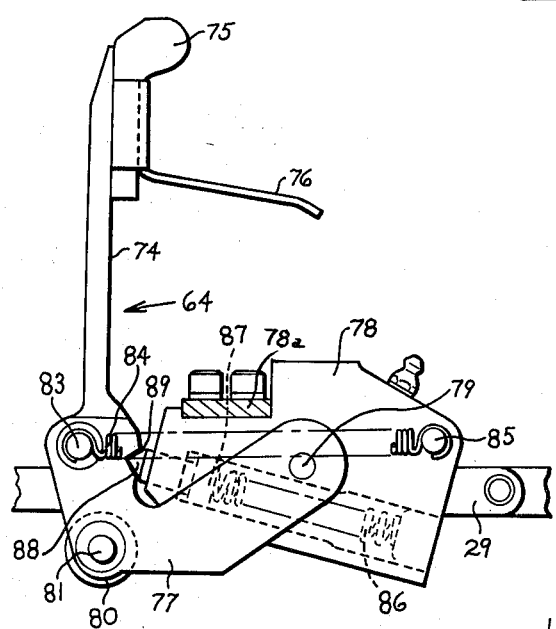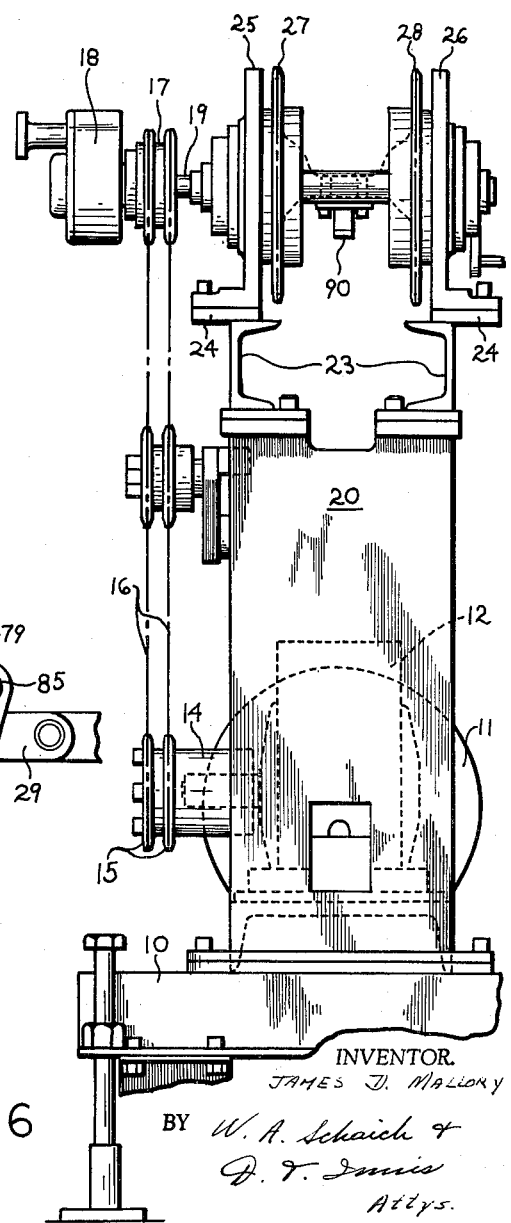

INVENTOR.
JAMES D. MALLORY
BY
ATTORNEYS

United States Patent Office 3,203,529
Patented Aug. 31, 1965

3,203,529
ARTICLE HANDLING APPARATUS
James D. Mallory, Maumee, Ohio, assignor to Owens-Illinois Glass Company, a corporation of Ohio
Filed Dec. 3, 1962, Ser. No. 241,868
8 Claims. (Cl. 198—33)

This invention relates to apparatus for handling and conveying articles, such as tumblers.

More particularly, this invention relates to apparatus for successively moving a plurality of glass articles from an upright position to a position in which the article is oriented in a predetermined horizontal relationship and engaged with a decorating machine chuck.

It has been the practice in the past to load formed glassware onto a decorating machine by hand, requiring the services of an operator who will normally pick the tumblers or articles from a conveyor and individually position the tumblers on horizontally extending chucks of a decorating machine, for example, a machine such as disclosed in U.S. Patent No. 2,885,957. In view of the fact that the decorating machines operate at relatively high speeds, the operator is required to load the tumblers on a multiple head decorating machine fairly rapidly and over an extended period of time it is extremely difficult for an operator to keep up with the decorating machine.

With the foregoing in view, it is an object of this invention to provide apparatus for automatically handling glass articles for orienting and conveying the articles to a particular position in relation to a decorating machine.

It is an additional object of this invention to provide apparatus for successively loading articles, such as tumblers, onto the spindle chucks of a decorating machine, which is fully automatic, and requires little or no attention.

Other and further objects will be apparent from the following description taken in conjunction with the annexed sheets of drawing, wherein:

FIG. 6 is a left end elevational view of the apparatus of FIG. 1;

FIG. 7 is an enlarged detailed view of the ware engaging and loading pusher dog.

Referring to FIGS. 1–3 and 6 of the apparatus of the invention, the general arrangement of the apparatus is shown and comprises a base 10 to which a motor 11 and suitable reduction gears 12 are mounted.

Figure 1:
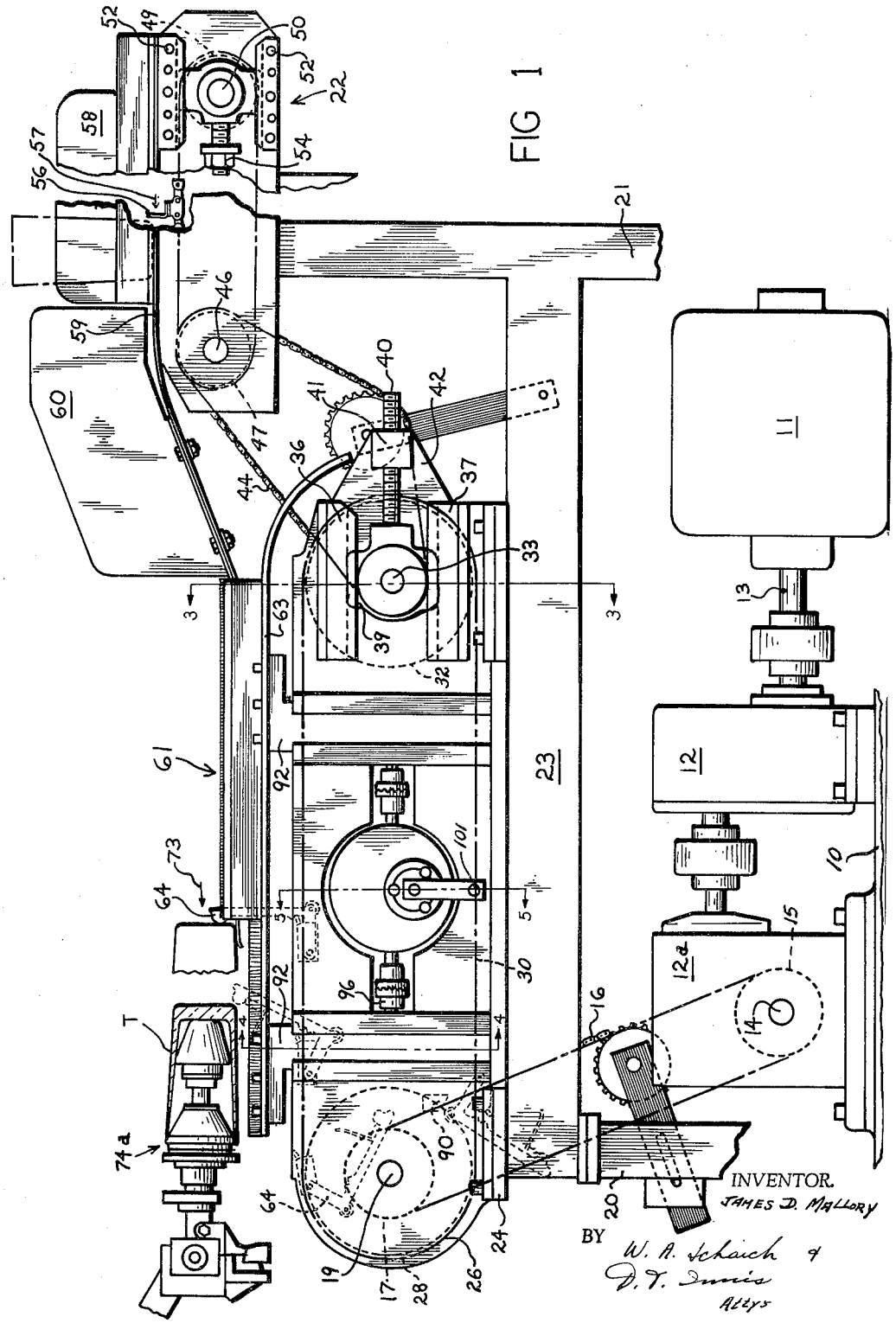
FIG. 1 is a side elevational view of the apparatus of the invention.

As can readily be seen when viewing FIG. 1, the motor 11 through a drive shaft 13 will rotate the reduction gear boxes 12 and 12a. The output shaft 14 of the gear box 12a has a dual sprocket 15 coupled thereto. The sprocket 15 serves as the main driving member for a pair of endless chains 16. The chains 16 extend generally vertically and pass over a double sprocket 17 which in turn is connected to a differential timing mechanism 18, with the mechanism 18 connected to an output drive shaft 19. The differential timing mechanism 18, in effect, is a variable connection having selective engagement points to provide for selective displacement between the sprocket 17 and the shaft 19. The purpose of the mechanism 18 is to provide adjustment for ware of different lengths, as will appear later.

Bolted to the upper surface of the base 10 is a pair of vertically extending support members 20 and 21. As can be seen when viewing FIG. 1, the member 21 is considerably longer than the member 20 and serves to support a continuously driven ware conveyor, generally designated 22. The support member 20 serves to support the forward end of a pair of spaced-apart horizontally extending channel members 23. These members 23 are connected at their opposite ends to the support member 21 and, in effect, define a horizontal surface to which the forward ware conveyor or support mechanism of the invention is mounted. The channel members 23 have plates 24 welded to their top surfaces, with the plates 24 in turn serving as the support members for L-shaped brackets 25 and 26.

The brackets 25 and 26, as best viewed in FIG. 6, are positioned parallel to each other and serve as bearing supports for the drive shaft 19, it being understood that suitable bearings are provided in the brackets 25 and 26 to rotatably support the shaft 19. The shaft 19 has a pair of spaced-apart sprockets 27 and 28 fixed thereto which are located between the brackets 25 and 26 and are rotated by rotation of the shaft 19. The sprockets 27 and 28 serve as driving members for a pair of endless chains 29 and 30. Chains 29 and 30 are in engagement with a second pair of sprockets 31 and 32 which are fixed to a shaft 33. The shaft 33 is supported at the rear end of the forward ware handling mechanism by a pair of L-shaped brackets 34 and 35 fixed to the plates 24. The brackets 34 and 35 have vertically displaced pairs of tracks 36 and 37 fixed thereto, between which shaft bearings 38 and 39 are received. The bearings 38 and 39 serve as end bearings for shaft 33 and permit the shaft to be adjusted horizontally so as to take up any slack in the chains 29 and 30. As can be seen when viewing FIG. 1, this take-up, or adjustment, is accomplished by turning a threaded shaft 40 connected to the member 39 and threaded through a stationary block 41 fixed to a flange 42 formed integral with the L-shaped bracket 34. The other end of the shaft 33 is provided with similar adjusting mechanism. Thus, the horizontal spacing between shaft 33 and shaft 19 is adjustable to insure that the chains 29 and 30 are maintained under predetermined tension or that excessive slack in the chains may be avoided.

One end of the shaft 33 extends beyond the bearing member 38 and has fixed thereto a pair of chain drive sprockets 43. The sprockets 43 serve to drive a pair of endless chains 44 which pass over a pair of driven sprockets 45 fixed to one end of a horizontal shaft 46 mounted within an upper conveyor mechanism, generally designated 22. The shaft 46 has a single sprocket 47 fixed thereto midway between the sides of the conveyor 22 (See FIG. 2). The sprocket 47 drives a chain 48 running over a second sprocket 49 mounted on a shaft 50 positioned at the rearward end of the conveyor or support 22. The shaft 50 may be adjusted relative to its distance from the shaft 46 in a manner similar to that described with respect to the adjustment of the shaft 33 and is provided with bearing blocks 51 which are horizontally slideable with respect to retaining brackets 52 by rotation of the threaded screws 53 in the stationary internally threaded blocks 54. Lock nuts 55 are provided on the screws 53 to prevent accidental movement of the bearing blocks through vibration. The chain 48 carries a plurality of spaced lugs 56 (only one of which is shown) which are adapted to contact the lower side wall of a tumbler and to move the tumblers at spaced intervals in the direction of the arrow 57 on FIG. 1. The tumblers are retained in their upright position on the conveyor mechanism 22 by vertical plates 58 which extend throughout substantially the full length of the mechanism 22 and are positioned on opposite sides of the chain 48. The upper surface 59 of the mechanism 22, as best seen when viewing FIG. 2 has a longitudinally extending opening dividing the surface into two spaced-apart horizontal bearing surfaces and the gap between the two portions of the surface 59 provide the area in which lugs 56 of the driven chain 48 are adapted to extend and travel.

As can readily be seen when viewing FIG. 1, the forward or left end of the surface 59 extends beyond the length of travel of the chains 48 and is, in effect, bent downward at an incline of approximately 20° to the horizontal, thus providing a downwardly inclined surface upon which tumblers or glassware are adapted to slide. The edges of the downwardly inclined portions of the surface 59 have generally vertically extending plates 60 bolted thereto which serve as guides to prevent the tumblers from sliding laterally from the surface 59 and, in effect, help retain the tumblers in an upright, yet somewhat inclined attitude as they slide by gravity down the inclined portion of the surface 59. The lower end of the inclined surface 59 extends over a second horizontal support or conveyor, generally designated 61.

Figure 2:
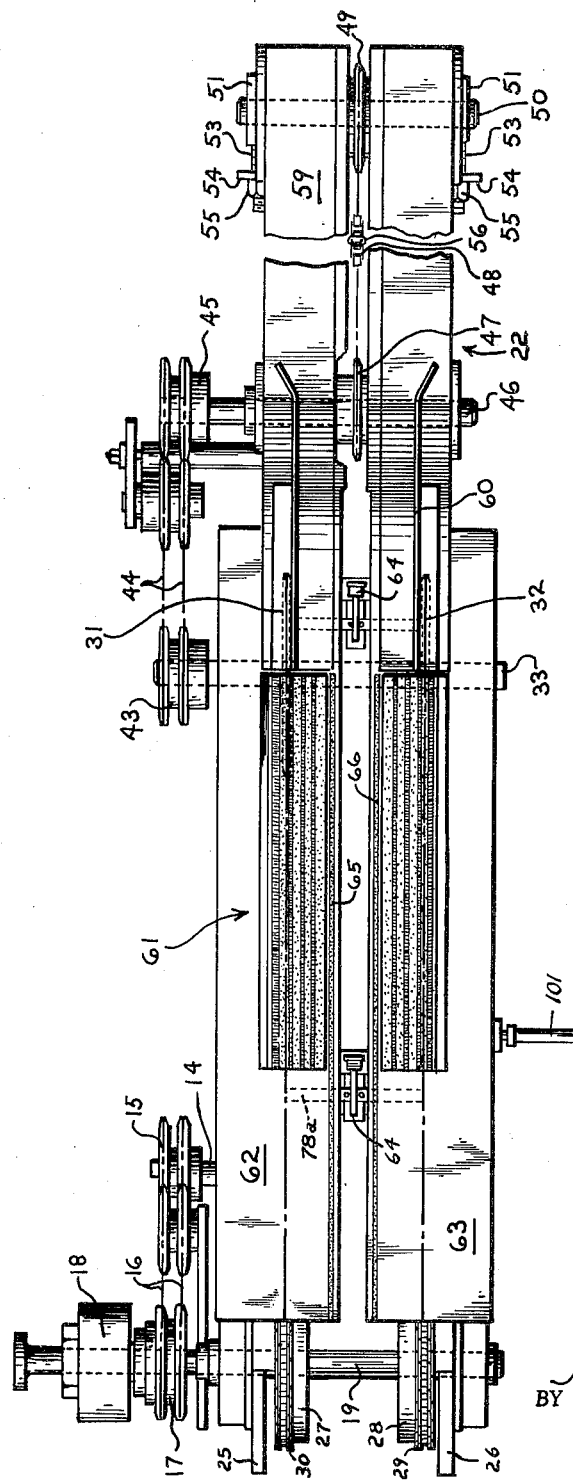
FIG. 2 is a top plan view of the apparatus of FIG. 1.
Figure 3:
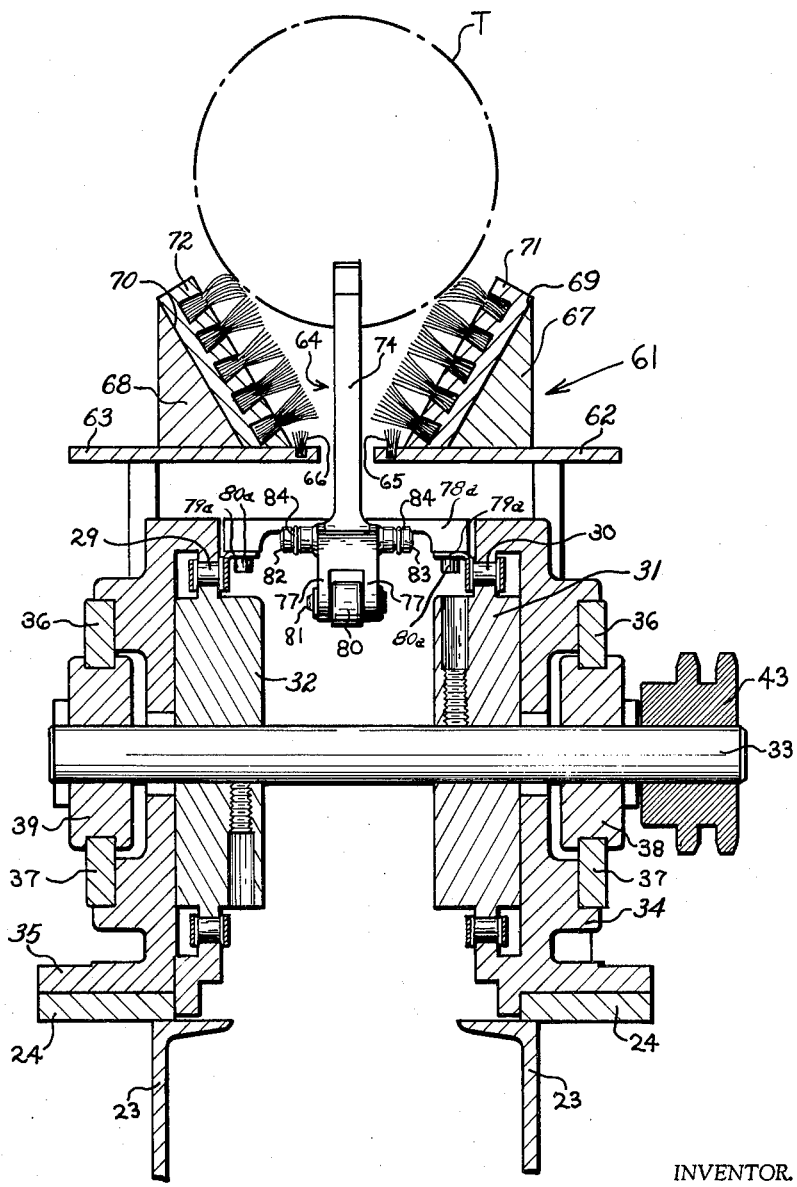
FIG. 3 is an enlarged cross-sectional view taken at line 3—3 of FIG. 1.

The second horizontal conveyor is comprised of a pair of longitudinally extending spaced-apart plate-like members 62 and 63. The spacing between the two members 62 and 63 provides access for a plurality of spaced pivotally mounted dogs 64 which are carried by the chains 29 and 30. The member 63, adjacent the gap between it and the member 62, has a row of upstanding bristles 65 extending substantially the full length thereof. Likewise, the member 62 carries a similar row of bristles 66. The rows of bristles 65 and 66 are sufficiently high and of sufficient rigidity to prevent glassware coming in contact therewith from touching the metal plate-like members 62 and 63. The upper surfaces of the members 62 and 63 also support two elongated wedge-shaped blocks 67 and 68 respectively. The two blocks 67 and 68 have their inclined surfaces 69 and 70 facing each other. The blocks 67 and 68 have elongated brushes 71 and 72 fixed to their surfaces 69 and 70, as shown in FIGS. 2 and 3. Each brush is shown as having five rows of bristles. However, any number of rows is sufficient so long as the downwardly and inwardly tapering surfaces formed by the ends of the bristles are sufficiently dense to support a tumbler or other glass articles while positioned on its side.

The outline of the tumbler T, shown in FIG. 3, is relatively large in diameter, thus a substantial portion of its weight is supported by the upper rows of bristles only. However, it should be understood that the apparatus of the invention is capable of handling ware having substantially smaller diameters, in which case the other bristles of the brushes 71 and 72 may serve as the major tumbler supporting surfaces.

As the tumblers slide down the inclined portion of the surface 59, the lower portion of the tumbler will contact the bristles of the brushes 71 and 72 and cause the tumbler, through its own inertia, to be tipped forward and the tumbler thus will be supported by the brushes 71 and 72 with the tumbler axis substantially horizontal. The dogs 64 are then adapted to contact the closed bottom end of the tumbler and move the tumbler in the direction of the arrow 73 on FIG. 1, toward the left, until the tumbler is seated firmly on the decorating machine chuck, generally designated 74a. The dog 64, by reason of the manner of its mounting to the chains 29 and 30, will release the ware and fall downwardly.

Figure 8:
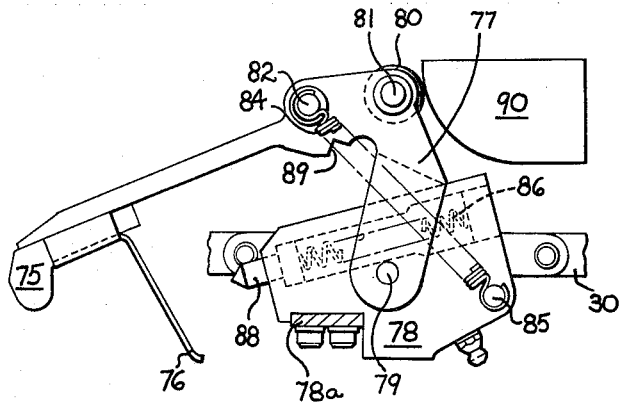
FIG. 8 is an enlarged, detailed view of the ware engaging and loading pusher dog in its released position.
Figure 9:
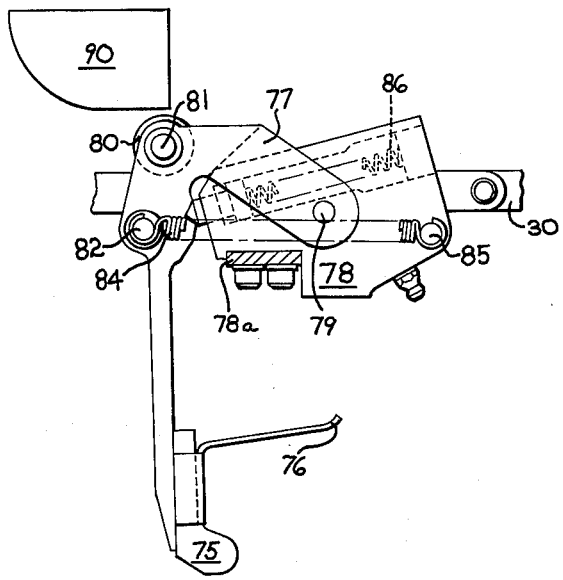
FIG. 9 is an enlarged, detailed view of the ware engaging and loading pusher dog after being returned to cocked position by engagement with a fixed cam.

With particular reference to FIGS. 7, 8 and 9 the specific construction of the dogs 64 will be described. The dogs 64 are comprised of an upstanding member 74 having a ware engaging member 75 at its upper end. This member 75 may be formed of nylon or any other suitable wear resistant material which also has the property of not scratching the bottom of the ware into which it will come in contact. A bent member 76 is connected to the same end of the member 74 at a position slightly below that of the ware contacting member 75 and extends at a slight incline to the horizontal. The member 76, which is relatively narrow, is adapted to engage the lower corner of a tumbler and in those situations where the tumbler to be handled has a tapered side wall, will aid in raising the bottom end of the tumbler so that the axis of the tumbler is horizontal at the time the tumbler is pushed onto the decorating spindle.

As can be seen when viewing FIG. 7, the member 76 extends at an incline and its extreme end is bent downward to insure that the end thereof will pass beneath ware that is supported on the conveyor 61. The member 74 has formed integrally therewith, generally horizontally extending bifurcated portions 77 which serve as the mounting means for the dog 64. The two portions 77 extend on either side of a block 78, with a pin 79 pivotally supporting the dog 64 on block 78. The block 78 has a generally horizontal bar 78a bolted thereto. The bar 78a extends transverse to the direction of movement of the dogs 64 and has enlarged ends to which tabs 79a are fixed by machine screws 80a, as shown. The tabs 79a are formed integral with selected links of the chains 29 and 30 and are bent at right angles to the vertical surfaces of the chain links. The bifurcated portions 77 of the dog 64 also serve as mounting brackets for a roller 80, with the roller 80 connected to the portions 77 by a pivot pin 81. A pair of studs 82 and 83 extend laterally from the sides of the member 74 and serve as anchors for a pair of tension springs 84. Only one of these springs is shown on FIG. 7. The other end of the springs 84 is connected to studs 85 which extend laterally from the side of the block 78. The springs 84 serve to maintain the dog 64 in its upright position, as shown in FIG. 7.

The block 78 houses a compression spring 86 acting against a slideable block 87 which has a locking detent 88 thereon which is held by the compression spring 86 in a locking recess 89 formed in the member 74. With the parts positioned as shown in FIG. 7, the springs 84 are strong enough to offset the compression of the spring 86. Additionally, the pivot axis of the dog 64 is only slightly below a horizontal plane defined by the locking recess 89. Furthermore, the springs 84 are acting in a plane which is also above the pivot axis 79 of the dog 64. However, as the dog is forced to the left, from the position shown in FIG. 7, by reason of the tumbler being firmly seated on the decorating chuck, the dog will be pivoted to such an extent that the studs 82 and 83 will be pivoted downwardly until the plane in which the tension spring 84 is acting is below the pivot axis 79 and at this time both the spring 84 and the compression spring 86 will be operating together in such a manner that the dog 64 will be pivoted about the pivot axis 79 in a counterclockwise direction, as viewed in FIG. 7, or in a clockwise direction, as viewed in FIG. 1. The dotted line positions of the dog, shown in FIG. 1, illustrate the various positions that the dog will assume as it becomes overbalanced and is released. Continued movement of the chains which carry the dogs will, of course, continue to carry the dogs around until the roller 80 of the dog comes in contact with a cam 90 (see FIG. 8), at which time the dog 64 will be repositioned or restored to the position shown in FIGS. 7 and 9 preparatory to being moved into engagement with a tumbler at the receiving end of the horizontal conveyor 61. The relationship of the cam 90 and the dog 64 is illustrated in FIGS. 8 and 9, where it can be seen that as the dog approaches the cam 90 the roller 80 contacts the cam 90 forcing the member 77 to pivot about the pivot 79 to the extent that the locking detent 88 begins to enter the locking recess 89. When the members 77 and 89 have reached this angular relationship, the spring 84, which biases the moveable part of the dog with respect to the support 78, will have the plane of action moved below the pivot point 79, as illustrated in FIG. 9, thus aiding the detent 88 in its final seating within the recess 89. This final seating of the detent 88 with respect to the recess 89 is brought about by the fact that the roller 80 actually clears the cam 90 by about a sixteenth of an inch when in cocked position as shown in FIG. 9.

Figure 4:
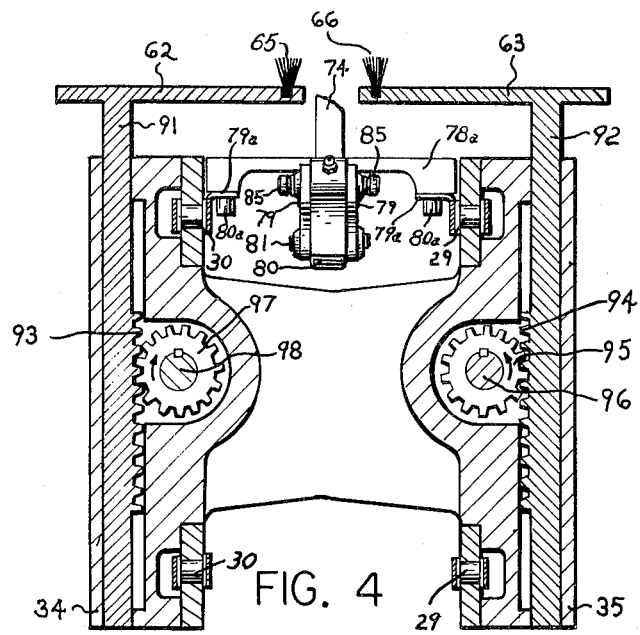
FIG. 4 is an enlarged cross-sectional view taken at line 4—4 of FIG. 1.
Figure 5:
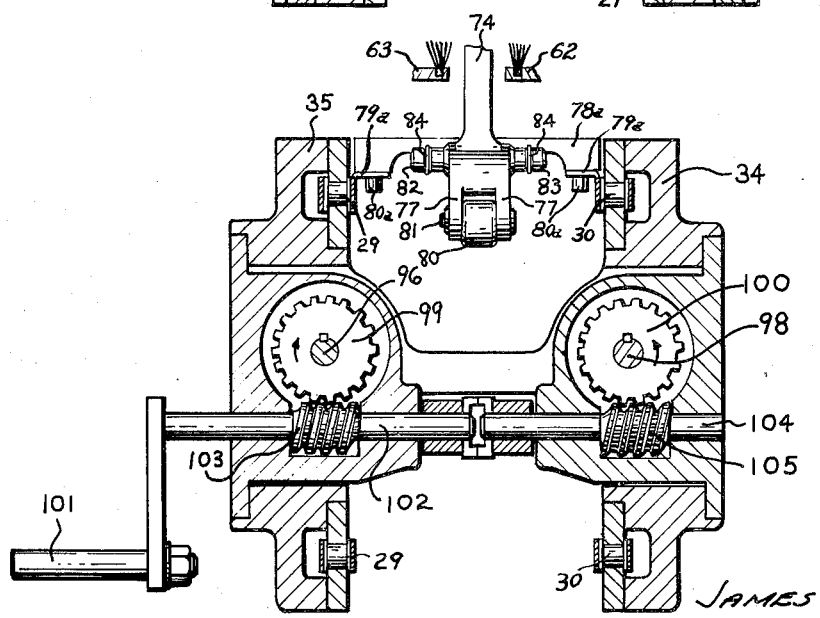
FIG. 5 is a cross-sectional view, on an enlarged scale, taken at line 5—5 of FIG. 1.

Turning now to FIGS. 4 and 5, the vertical adjustment of the second conveyor 61, or rather the plate-like members 62 and 63 which constitute its upper supporting surface, will be described.

It is desirable that the ware supporting surface of the conveyor 61 be adjustable from the standpoint that the center line of the tumblers as they are being handled by the conveyor 61, should be substantially in line with and at the same height as the decorating chuck or ware receiving member 74. Since the conveyor 61 is principally composed of two plate-like members 62 and 63, it is necessary, therefore, in order to elevate the conveyor 61, that both the surfaces 62 and 63 be elevated the same amount during any adjustment. This is accomplished by having the members 62 and 63 formed integral with or mounted on pairs of spaced, vertically extending members 91 and 92, it being understood that the members 92 are connected to the plate-like member 63 and the members 91 are connected to the plate-like member 62. The members 91 have rack teeth 93 formed intermediate their length and the members 92 have similar rack teeth 94 formed intermediate their length. Both the members 91 and 92 are supported for vertical sliding movement within guides which are part of the aforementioned L-shaped brackets 34 and 35. A pinion 95, mounted on a shaft 96, is in engagement with the rack teeth 94 of the member 92. A similar pinion 97, mounted on a shaft 98, is in engagement with the rack teeth 93 of the member 91. It should be understood that there are identical pinions 95 and 97 which will be in engagement with the rack teeth of the other two members 91 and 92 which support the plate-like members 62 and 63 respectively. In order to insure that both pinions 97 and 95 are rotated equally and in the proper direction so that the plate-like members 62 and 63 move togther, shafts 96 and 98 carry a pair of worm wheels 99 and 100, respectively.

The worm wheels 99 and 100 are rotated by hand through operation of a crank 101 connected to a shaft 102 carrying a worm 103 and coupled to a shaft 104 carrying a worm 105, as seen in FIG. 5. Thus, it can be seen that operation of the crank 101 will serve to rotate shafts 96 and 98 in opposite directions, thus insuring that both plate-like members 62 and 63 will be raised or lowered in parallel relationship to adjust the height of the horizontal conveyor 61 with respect to the decorating chuck 74a of the decorating machine.

Thus, applicant has described apparatus for receiving tumblers or like glass articles in an upright position on a first horizontal support with an endless chain having pusher members adapted to engage and slide the upright tumblers in a predetermined spaced-apart relationship to a downwardly inclined surface by which the tumblers are carried by gravity to the receiving end of a second generally horizontal support.

The second horizontal support is provided with brushes or bristles arranged thereon in such a manner as to support the tumbler on its side. By reason of the position of the second support and its relationship to the inclined delivery surface, the tumblers are automatically tipped on to their sides on the brushes or bristles of the second support. A pair of endless chains carrying a plurality of spaced, retractable dogs are driven so that the dogs travel in a generally straight line throughout the length of the second support and engage the closed bottom end of the tumblers as they are successively tipped onto the second support. The dogs will push the tumblers with their open ends forward in a straight line while the tumblers are supported on the bristles or brushes of the support, providing a sliding arrangement which prevents scratching or other marring of the tumblers.

An automatic screen decorating machine having a plurality of radially extending tumbler receiving chucks 74a will successively position a chuck at the end of the second support and the dogs will push the tumblers on to the chucks in succession. In this manner the apparatus of the invention receives tumblers in an upright position, turns the tumblers on their sides and positions the tumblers on the decorating chucks. By reason of the fact that it is desirable that the apparatus of the invention handle tumblers of varying diameters and lengths, the second supporting surface, which carries the brushes or bristles, is adjustable in height with respect to the main supporting base so as to accommodate its guiding surfaces for tumblers of various diameters.

Furthermore, the differential timing mechanism 18, as previously stated, is to provide for selective displacement between the sprocket 17 and the drive shaft 19. It can readily be seen that it is necessary that the tumblers, regardless of their length, be supplied to the automatic decorating machine at a rate synchronous with the presentation of chucks 74a at the delivery end of the conveyor mechanism 61. Therefore, the differential timing mechanism 18 is provided so as to insure that tumblers will arrive and be loaded on the decorating machine chucks at the proper interval of time in the pause of the decorating chucks in receiving position. Obviously, where the length of the tumbler may vary from one production run to another, the position of the dogs 64, at the time that the chucks are loaded, will vary. Thus, it is necessary in order to insure that there will be synchronism in the drive of the dogs in relation to the indexing of the decorating machine chucks, that some mechanism be provided for adjusting the relationship of these drives. With this in mind, the differential timing mechanism 18 will permit the selective engagement and disengagement of the sprocket 17 to the drive shaft 19.

While the invention has been described with reference to the preferred form thereof, it should be apparent to those skilled in the art that further modifications and changes may be made therein without departing from the spirit and scope thereof as defined by the following claims.

I claim:

1. Apparatus for successively loading tumblers on spindles of a decorating machine comprising a first horizontal slideway for supporting tumblers placed thereon in an upright position, means for engaging and sliding tumblers in a straight line at spaced intervals on said slideway, a downwardly sloping slideway having a flat surface joined to the end of said first horizontal slideway, a second horizontal slideway positioned at the lower end of said sloping slideway, means carried by the second slideway for engaging the bottom portion of tumblers as they reach the second horizontal slideway for causing the tumblers to fall forward into horizontal position on said second horizontal slideway, and means engaging the closed ends of said tumblers for sliding said tumblers in succession in the direction of their fall into engagement with horizontal spindles of a decorating machine.

2. The apparatus as defined in claim 1, further comprising a base for supporting said slideways and means connecting said second slideway to said base for adjusting the vertical height of said second slideway.

3. Apparatus for conveying and orienting glass articles comprising a first elongated, horizontal support for receiving glass articles thereon in an upright position, an endless chain positioned below said support, a plurality of spaced lugs carried by said chains and extending through an elongated opening in said support for moving said articles at spaced intervals on said support in a straight line, a second elongated, horizontal support, a second endless chain positioned below said second support, a plurality of spaced pivotal dogs carried by said second chain and adapted to extend through an elongated opening in said support engaging and pushing articles on said second support, means for driving said chains in synchronism, said second support being positioned with its article supporting surface below that of the first conveyor, a downwardly sloping slideway joining one end of said first support to one end of the second support, said sloping slideway having a flat, upper surface for receiving the bottom of glass articles, and means connected to the rearward end of said second support for engaging the lower portion of the glass articles as they slide down the sloping slideway for causing them to fall forward and cushion the articles from impact.

4. Apparatus for conveying and orienting glass articles comprising a first horizontal slideway for receiving glass articles thereon in an upright position, means extending through said slideway and operable for moving said articles at spaced intervals in a straight line on said slideway, a second horizontal slideway for receiving articles from said first conveyor, means extending through said second slideway for moving said articles in succession, said second slideway being positioned with its article supporting surface below that of the first slideway, a downwardly sloping slideway joining the ends of said first and second slideways, said sloping slideway having a flat, upper surface for sliding engagement with the bottoms of glass articles, and means formed at the receiving end of said second slideway for engaging the lower portion of the glass articles as they slide down the sloping slideway for causing them to tip forward into horizontal position.

5. The apparatus as set forth in claim 4, wherein said second slideway comprises an elongated, generally horizontal flat surface having a central opening therein extending the full length thereof, a row of upstanding fibers extending along the edges of said opening and parallel rows of brush-like fibers mounted on upwardly and outwardly inclined surfaces carried by said flat surface, whereby glass articles will be supported on said second slideway by the brush-like fibers.

6. Apparatus for successively loading tumblers on spindles of a decorating machine comprising a first horizontal slideway for supporting tumblers placed thereon in an upright position, a plurality of spaced members carried by an endless chain for engaging and sliding tumblers in a straight line at spaced intervals on said slideway, a downwardly sloping slideway forming an extension of said first horizontal slideway, a second horizontal slideway positioned at the lower end of said sloping slideway, means mounted on the second horizontal slideway at the receiving end thereof for causing the tumblers to fall forward into horizontal position on said second horizontal slideway, and driven means engaging the closed ends of said tumblers for sliding said tumblers on said second slideway in succession in the direction of their fall into engagement with horizontal spindles of a decorating machine maintained in alignment with the end of said second slideway.

7. The apparatus as defined in claim 6, further comprising means for supporting said slideways at predetermined levels and means connected to said second slideway for adjusting the vertical height of said second slideway with respect to the first slideway.

8. The apparatus as set forth in claim 6, wherein said second slideway comprises an elongated, generally horizontal flat surface having a central opening therein extending the full length thereof, a row of upstanding fibers extending along the edges of said opening and parallel rows of brush-like fibers mounted on upwardly and outwardly inclined surfaces carried by said flat surface, whereby glass articles will be supported on said second slideway by the brush-like fibers.

References Cited by the Examiner

UNITED STATES PATENTS

| | | | |
|---|---|---|---|
| 1,224,379 | 5/17 | Honohan | 198—170 X |
| 2,680,876 | 6/54 | Oates | 198—170 X |
| 2,780,343 | 2/57 | Bunnell | 198—170 |
| 2,817,933 | 12/57 | Bell | 198—170 X |
| 2,935,173 | 5/60 | Cozzoli. | |
| 3,043,415 | 7/62 | Mottin | 198—20 |
| 3,071,065 | 1/63 | Macy | 198—173 X |

SAMUEL F. COLEMAN, *Primary Examiner.*

EDWARD A. SROKA, *Examiner.*